United States Patent
Natarajan et al.

(10) Patent No.: US 12,292,814 B1
(45) Date of Patent: May 6, 2025

(54) SYSTEMS AND METHODS TO PROVIDE DYNAMIC PARTICIPATION OF MULTIPLE SERVICES FOR GENERATING HEALTH STATUS SCORES IN A D-BUS ARCHITECTURE

(71) Applicant: Dell Products, L.P., Round Rock, TX (US)

(72) Inventors: Diwahar Natarajan, Austin, TX (US); Arun Muthaiyan, Round Rock, TX (US); Naseer Ahmed Kalyandrug, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 50 days.

(21) Appl. No.: 18/493,882

(22) Filed: Oct. 25, 2023

(51) Int. Cl.
*G06F 11/34* (2006.01)
*G06F 13/36* (2006.01)

(52) U.S. Cl.
CPC ............ *G06F 11/349* (2013.01); *G06F 13/36* (2013.01)

(58) Field of Classification Search
CPC ............................... G06F 13/36; G06F 11/349
See application file for complete search history.

(56) References Cited

U.S. PATENT DOCUMENTS

| | | | | |
|---|---|---|---|---|
| 5,887,146 A | * | 3/1999 | Baxter | G06F 11/22 714/E11.16 |
| 6,970,948 B2 | * | 11/2005 | Brown | G06F 9/4411 711/170 |
| 2003/0126329 A1 | * | 7/2003 | Jung | G06F 13/366 710/104 |

FOREIGN PATENT DOCUMENTS

CN 106873548 A * 6/2017 ....... G05B 19/41875

OTHER PUBLICATIONS

Translation of CN-106873548-A (Year: 2017).*

* cited by examiner

*Primary Examiner* — Henry Tsai
*Assistant Examiner* — John B Roche
(74) *Attorney, Agent, or Firm* — Fogarty LLP

(57) ABSTRACT

Embodiments of the present disclosure provide systems and methods to provide dynamic participation of multiple services to generate an overall health score in a Desktop Bus (D-Bus) platform. According to one embodiment, an Information Handling System (IHS) includes multiple hardware devices that are managed by a plurality of D-Bus objects that communicate among one another using a D-Bus in which the D-Bus objects are arranged in a hierarchy of parent-child relationships. The IHS also includes computer-executable code to cause each of the D-Bus objects to receive a request for a health score of one of one of the hardware devices that it manages using one or more child objects that interact with the one hardware device, generate an intermediate health score using measurements obtained by its child objects, and send the intermediate health score to its parent object.

20 Claims, 6 Drawing Sheets

SYSTEMS AND METHODS TO PROVIDE DYNAMIC PARTICIPATION OF MULTIPLE SERVICES FOR GENERATING HEALTH STATUS SCORES IN A D-BUS ARCHITECTURE

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

Embodiments of the present disclosure provide systems and methods to provide dynamic participation of multiple services to generate an overall health score in a Desktop Bus (D-Bus) platform. According to one embodiment, an Information Handling System (IHS) includes multiple hardware devices that are managed by a plurality of D-Bus objects that communicate among one another using a D-Bus in which the D-Bus objects are arranged in a hierarchy of parent-child relationships. The IHS also includes computer-executable code to cause each of the D-Bus objects to receive a request for a health score of one of one of the hardware devices that it manages using one or more child objects that interact with the one hardware device, generate an intermediate health score using measurements obtained by its child objects, and send the intermediate health score to its parent object.

According to another embodiment, a Desktop Bus (D-Bus)-based health status generation method includes the steps of providing a plurality of hardware devices that are managed by a plurality of D-Bus objects that communicate among one another using a D-Bus, the D-Bus objects arranged in a hierarchy of parent-child relationships, receiving a request for a health score of one of one of a plurality of hardware devices that it manages using one or more child objects that interact with the one hardware device, generating an intermediate health score using measurements obtained by its child objects, and sending the intermediate health score to its parent object.

According to yet another embodiment, a memory storage device is configured with program instructions stored thereon that, upon execution by one or more processors of a client Information Handling System (IHS), cause the client IHS to receive a request for a health score of one of one of a plurality of hardware devices that it manages using one or more child objects that interact with the one hardware device, the hardware devices being managed by a plurality of Desktop Bus (D-Bus) objects that communicate among one another using a D-Bus in which the D-Bus objects arranged in a hierarchy of parent-child relationships. The instructions further cause the IHS to generate an intermediate health score using measurements obtained by its child objects, and send the intermediate health score to its parent object.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
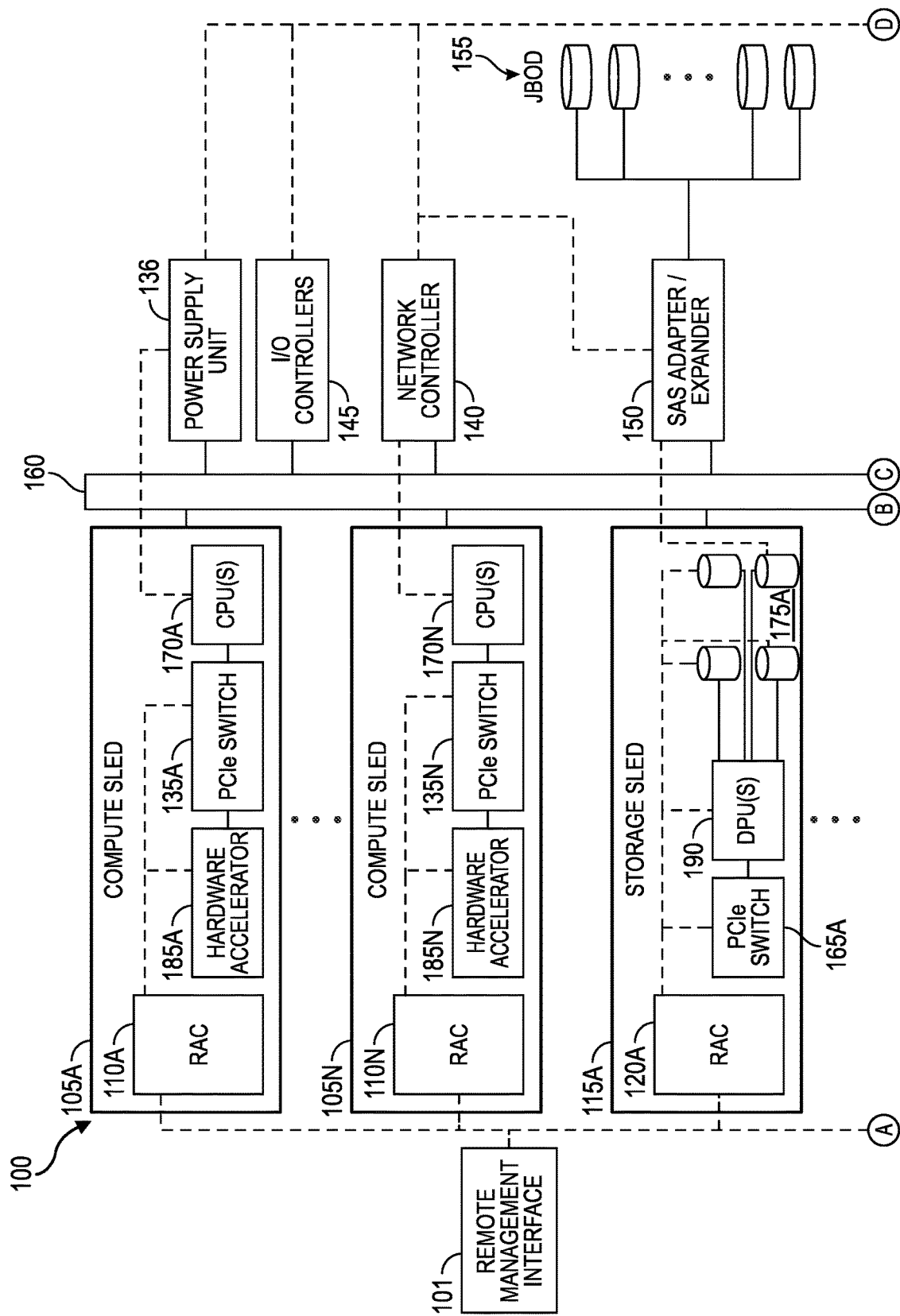
FIGS. 1A and 1B illustrate certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration. The BMC may include a processor, memory, and an out-of-band network interface separate from and physically isolated from an in-band network interface of the IHS, and/or other embedded resources. In certain embodiments, the BMC may include or may be part of a Remote Access Controller (e.g., a DELL Remote Access Controller (DRAC) or an Integrated DRAC (iDRAC)).

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

Advances in BMC design has led to the development of an Inter-Process Communication (IPC) and remote procedure call (RPC) mechanism, such as Desktop Bus (D-Bus), which typically operate outside the operating-system space. D-Bus is usually provided as a "daemon" process that functions in the background to effectively facilitate exchange of IPC messages between processes that provide various services. Implementation of D-Bus in BMCs are advantageous in that it provides for abstraction of invoking interfaces of a service and responding to interface invocations. Thus, the service may be shielded from, among other things, serialization and deserialization of data shared with other services, thus yielding portable services that may be easily migrated from one platform to another. Because D-Bus is a standard feature provided by the openBMC platform, it may be beneficial to re-use established services on other platforms, such as vendor-based platforms, such as Open Server Manager (OMS) provided by DELL TECHNOLOGIES and vice-versa.

Nevertheless, while implementation of D-Bus in BMCs may provide enhanced manageability, transparency, and customization, its implementation has not been without drawbacks. For example, BMCs have conventionally been provided with health status tools to aid users in managing their servers (IHSs). Nevertheless, existing processes on BMCs mostly have their own health status calculation and report a different component health status based on their custom algorithms. For example, a temperature sensor daemon process running on a BMC may calculate and report its health status calculation differently than a fan sensor daemon process. Calculating an accurate overall health status for the BMC, however, should involve an aggregated product contributed by multiple processes with different hardware devices (e.g., subcomponents).

In addition, when new BMC developments that involve D-Bus have been completed, the resulting D-Bus architecture may not be able to integrate the SDK health status into the overall BMC health status due largely to the fact that D-Bus allows processes to run independently of one another. The result is that the user may be burdened with monitoring multiple health status calculations for each independent process. Moreover, since multiple processes would be required to calculate their own health status, the chances of un-correlated errors are multifold. To derive an accurate overall health score, each individual process that calculates the health status should be aware of the health status of other hardware devices in the BMC. To meet this need, a single entity would be required to collect, compute and publish the overall health status. With this approach, however, most or all the possible combinations would need to be pre-programmed, and adding new components to the health status calculation would in many cases, require changes across the existing processes to manage their inter-dependencies. As will be described in detail herein below, embodiments of the present disclosure provide a system and method to provide dynamic participation of multiple services to generate an overall health score in a D-Bus architecture.

Figure 1B:
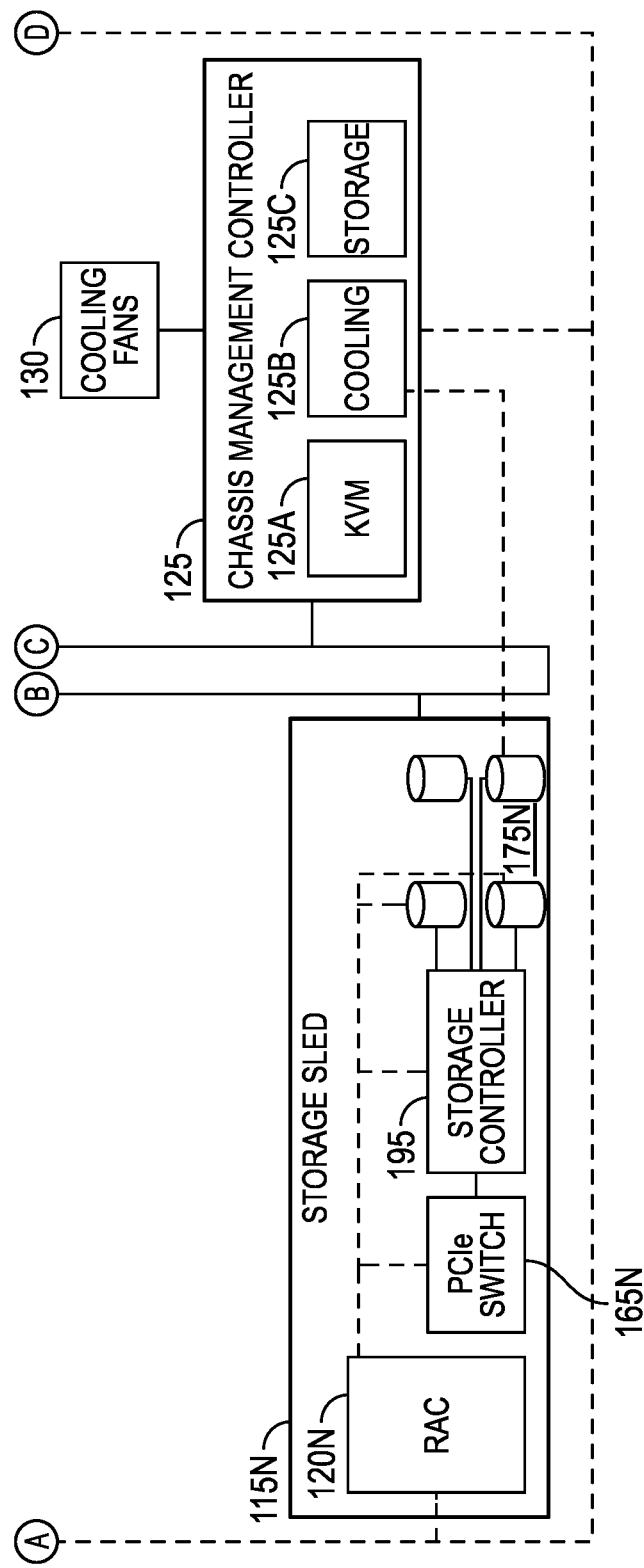

FIG. 1 is a block diagram illustrating certain components of a chassis 100 comprising one or more compute sleds 105a-n and one or more storage sleds 115a-n that may be configured to implement the systems and methods described according to one embodiment of the present disclosure. Embodiments of chassis 100 may include a wide variety of hardware configurations in which one or more sleds 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power, and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans 130 to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 136.

Figure 2:
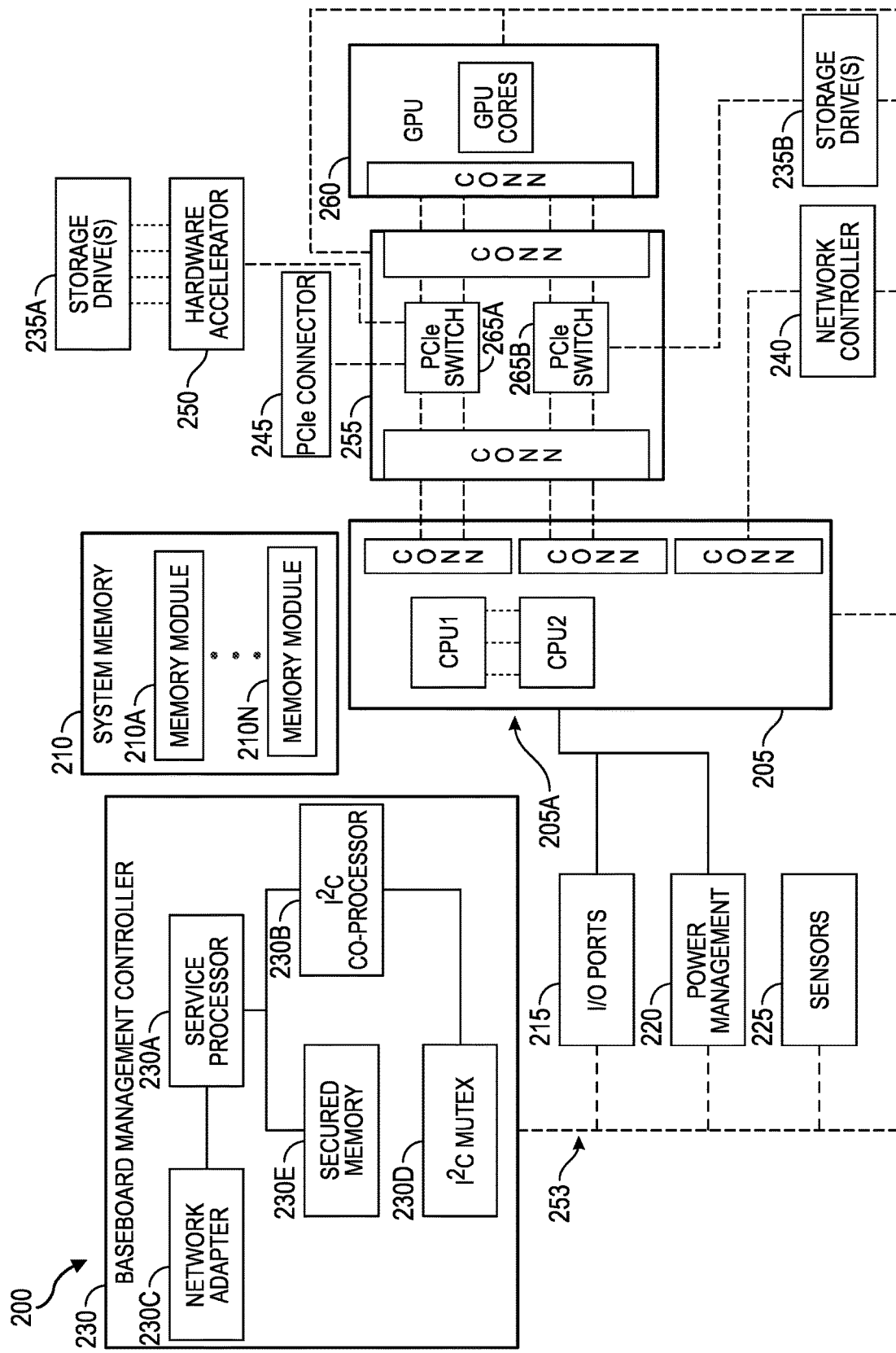
FIG. 2 illustrates an example of an IHS configured to implement systems and methods described herein according to one embodiment of the present disclosure.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective Baseboard Management Controller (BMC) 110a-n, 120a-n also known as a remote access controller (RAC). As described in additional detail with regard to FIG. 2, BMC 110a-n, 120a-n provides capabilities for remote monitoring and management of a respective sled 105a-n, 115a-n and/or of chassis 100. In support of these monitoring and management functions, BMCs 110a-n may utilize both in-band and sideband (i.e., out-of-band) communications with various managed components of a respective sled 105a-n and chassis 100. Remote access controllers 110a-n, 120a-n may collect diverse types of sensor data, such as collecting temperature sensor readings that are used in support of airflow cooling of the chassis 100 and the sleds 105a-n, 115a-n. In addition, each BMC 110a-n, 120a-n may implement various monitoring and administrative functions related to a respective sled 105a-n, 115a-n, where these functions may be implemented using sideband bus connections with various internal components of the chassis 100 and of the respective sleds 105a-n, 115a-n. As described in additional detail below, in various embodiments, these capabilities of the BMCs 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The BMCs 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the BMCs 110a-n, 120a-n. The remote management interface 101 may also include various monitoring interfaces for evaluating telemetry data collected by the BMCs 110a-n, 120a-n. In some embodiments, remote management interface 101 may communicate with BMCs 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage drives 155 may be accessed via a SAS expander 150 that is coupled to the backplane 160 of the chassis 100. The SAS expander 150 may support connections to a number of JBOD (Just a Bunch of Disks) storage drives 155 that, in some instances, may be configured and managed individually and without implementing data redundancy across the various drives 155. The additional storage drives 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 require the updates to be applied within each of these topologies being supported by the chassis 100. Despite the substantial number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n, or other type of server, such as an 1 RU server installed within a 2 RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the HIS 200. Upon powering or restarting IHS 200, CPUs 205 may utilize BIOS instructions to initialize and test hardware components coupled to the HIS 200, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the BMC 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of HIS 200, such as the BIOS and boot loader of IHS 200. These calculated hash values may then be compared against reference hash values that were previously stored in a secure non-volatile memory of the HIS 200, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, SmartNIC, GPU and/or FPGA, that may be a connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with storage drives 235a, thus supporting high-bandwidth connections with the storage drives. Hardware accelerator 250 may also include one or more memory devices used to store program instructions executed by the processing cores and/or used to support the operation of storage drives 235a such as in implementing cache memories and buffers utilized in support of high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a BMC 230 that supports remote management of IHS 200 and of various internal components of IHS 200. In certain embodiments, BMC 230 may operate from a different power plane from the processors 205 and other components of IHS 200, thus allowing the BMC 230 to operate, and management tasks to proceed, while the processing cores of IHS 200 are powered off. Various functions provided by the BIOS, including launching the operating system of the IHS 200, and/or functions of a TPM may be implemented or supplemented by the BMC 230. In some embodiments, the BMC 230 may perform various functions to verify the integrity of the IHS 200 and its hardware components prior to initialization of the operating system of IHS 200 (i.e., in a bare-metal state). In some embodiments, certain operations of the BMC 230, such as the operations described herein for updating firmware used by managed hardware components of IHS 200, may operate using validated instructions, and thus within the root of trust of IHS 200.

In some embodiments, BMC 230 may include a service processor 230a, or specialized microcontroller, which operates management software that supports remote monitoring and administration of IHS 200. The management operations supported by BMC 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the BMC 230 may utilize information collected by various managed sensors 225 located within the IHS. For instance, temperature data collected by sensors 225 may be utilized by the BMC 230 in support of closed-loop airflow cooling of the IHS 200. As indicated, BMC 230 may include a secured memory 230e for exclusive use by the BMC 230 in support of management operations.

In some embodiments, BMC 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the BMC 230 may additionally or alternatively use MCTP messaging to transmit Vendor Defined Messages (VDMs) via the in-line PCIe switch fabric supported by PCIe switches 265a-b. In some instances, the sideband management connections supported by BMC 230 may include PLDM (Platform Level Data Model) management communications with the managed devices 205, 235a-b, 240, 250, 255, 260 of IHS 200.

As illustrated, BMC 230 may include a network adapter 230c that provides the BMC with network access that is separate from the network controller 240 utilized by other hardware components of the IHS 200. Through secure connections supported by network adapter 230c, BMC 230 communicates management information with remote management interface 101. In support of remote monitoring functions, network adapter 230c may support connections between BMC 230 and external management tools using wired and/or wireless network connections that operate using a variety of network technologies. As a non-limiting example of a BMC, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the BMC. As illustrated in FIG. 2, the managed devices 205, 235a-b, 240, 250, 255, 260 of IHS 200 are coupled to the CPUs 205, either directly or directly, via in-line buses that are separate from the I2C sideband bus 253 connections used by the BMC 230 for device management.

In certain embodiments, the service processor 230a of BMC 230 may rely on an I2C co-processor 230b to implement sideband I2C communications between the BMC 230 and the managed hardware components 205, 235a-b, 240, 250, 255, 260 of the IHS 200. The I2C co-processor 230b may be a specialized co-processor or micro-controller that is configured to implement an I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 253 is illustrated as single line in FIG. 2. However, sideband bus 253 may be comprised of multiple signaling pathways, where each may be comprised of a clock line and data line that couple the BMC 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
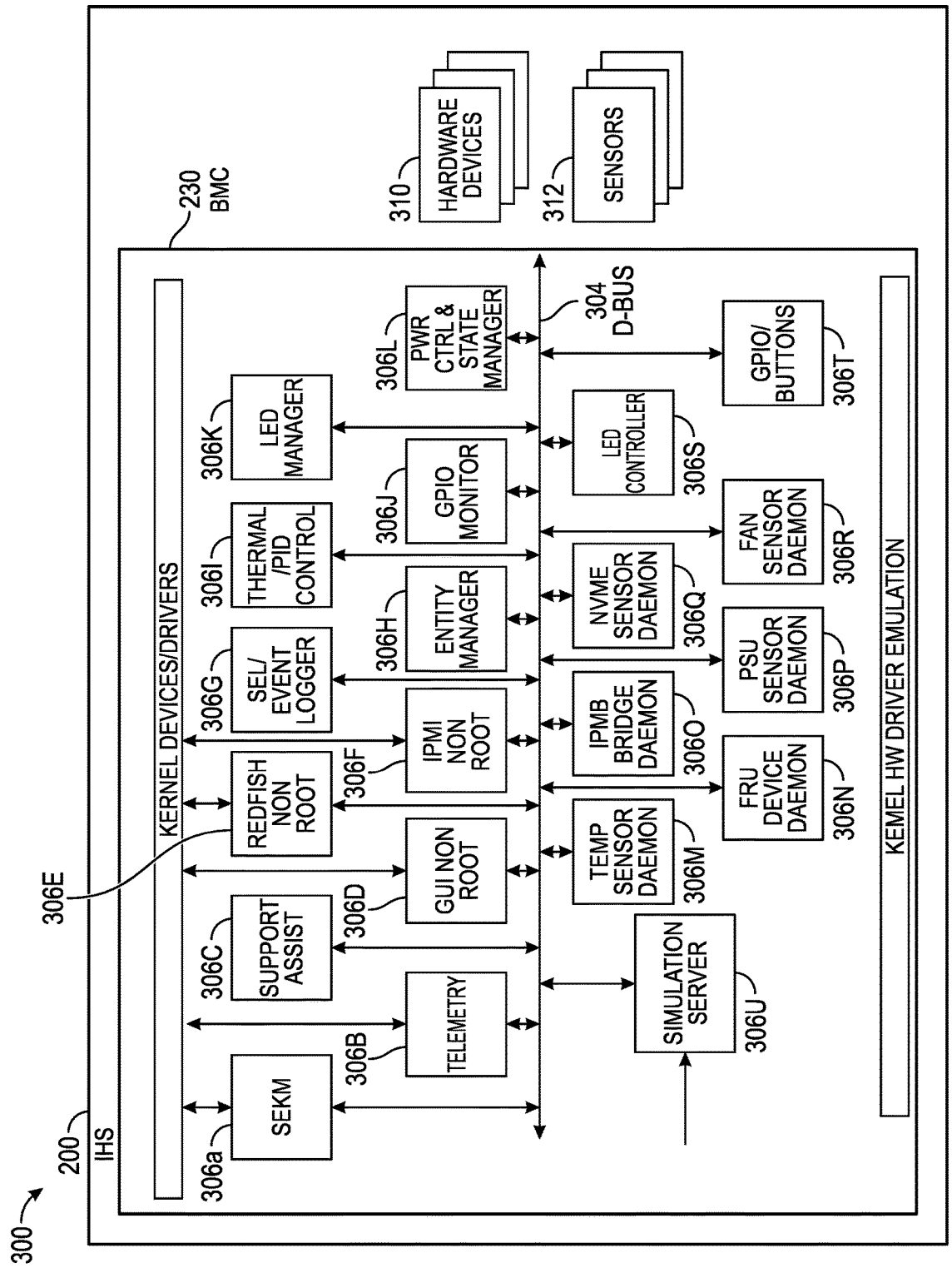
FIG. 3 is a diagram illustrating several components of a D-Bus-based health status generation system that may be used to provide dynamic participation of multiple services to generate an overall health status in a D-Bus architecture according to one embodiment of the present disclosure.

FIG. 3 is a diagram 300 illustrating several components of a D-Bus-based health status generation system 300 that may be used to provide dynamic participation of multiple services to generate an overall health status in a D-Bus architecture according to one embodiment of the present disclosure. The D-Bus-based health status generation system 300 includes an IHS 200 configured with a BMC 230, which is itself configured with a D-Bus layer 304 and multiple D-Bus services 306a-u (collectively 306) that communicate with one another through the D-Bus layer 304. The IHS 200 also includes multiple hardware devices 310 and sensors 312 that may be managed by the services 306. Each of the hardware devices 310 and sensors 312 may be any type, such as those described above with reference to FIGS. 1A-2. According to embodiments of the present disclosure, the D-Bus-based health status generation system 300 includes a health status service 306 that generates an overall health status of the IHS 200 in a manner that the services 306 can dynamically participate in generating its overall health status.

The health status, which may be represented as a health score, of the IHS 200 may be generated by evaluating the performance or stability of the system using various performance or stability metrics (e.g., measurements). The health of the IHS 200 may represent the overall stability and/or performance of the IHS 200, and may be represented as a percentage value relative to some maximum health index. For example, an IHS with optimal health may have a health score of 100 percent (%), while an IHS 200 in poor health may have a health score of 50-70%.

An overall system health score for the IHS 200 may be calculated using aggregated health information that is obtained from each of the sub-components (e.g., hardware devices 310, sensors 312, etc.). For example, health scores that are received from each of the different subcomponents may be combined and averaged to determine the overall system health score for the IHS 200. The relative level that an individual hardware device or sensor health score affects the overall system health score of the online service may be configurable. For example, certain hardware devices 310 of the IHS 200 may be weighted relatively higher such that its health score has a higher priority relative to other sub-components having a lower priority. Health scores may also be determined for different hardware devices 310 of the IHS 200. For example, there may be an overall health score that is determined for the entire IHS 200, as well as other health scores that are determined for certain hardware devices 310 in the IHS 200.

Generally speaking, the D-Bus-based health status generation system 300 defines the way each sub-component declares its health path, which has its parent information embedded in its health path, along with the access to system level health path. Even though the health path defines the path to root node, they are not tightly coupled and provide flexibility for dynamic addition and removal. Using the defined health path, hardware device 310 health scores may be promoted upwards to each respective parent object to reflect its health status to the root health status object 306*n*. Using the D-Bus objects, the health status will be maintained by each process based on the component or sub-component that the process is responsible for. Once the current health status of the process is calculated at the sub-component level, then a D-Bus message may be sent to its parent for it to compute its own health in coherence with all its child object's health. The parent may then be propagated to its parent in a likewise manner for it to compute its own health score and so on until the root object (e.g., health status service 306*n*) calculates an overall health score for the IHS 200.

The services 306 using the D-Bus 304 may be any suitable type, and may be generally delineated as hardware-based services or non-hardware-based services. A hardware-based service may be one that directly interacts with the hardware devices 310 or sensors 312 to, among other things, obtain telemetry metrics (e.g., measurements) from and/or control the operation of the hardware devices 310 or sensors 312, while a non-hardware-based service may be one that essentially has no direct interaction with the hardware devices 310 or sensors 312. Examples of non-hardware-based services may include a Secure Enterprise Key Manager (SEKM) module 306*a*, a support assist module 306*c*, a non-root GUI module 306*d*, a non-root redfish module 306*e*, an Intelligent Platform Management Interface (IPMI) module 306*f*, a SEL/Event logger module 306*g*, an entity manager 306*h*. Examples of hardware-based services may include a thermal/PID control module 306*i*, a GPIO monitor 306*j*, a LED manager 306*k*, a power control and state manager 306*l*, a telemetry module 306*b*, a temperature sensor daemon 306*m*, a Field Replaceable Unit (FRU) device daemon 306*n*, an IPMB bridge daemon 306*0*, a Power Supply Unit (PSU) sensor daemon 306*p*, an NVMe sensor daemon 306*q*, a fan sensor daemon 306*r*, an LED controller module 306*s*, and a GPIO/Buttons module 306*t* as shown in FIG. 3. It should be appreciated that other embodiments may have additional, fewer, or different services 306 than what is shown and described herein.

Figure 4:
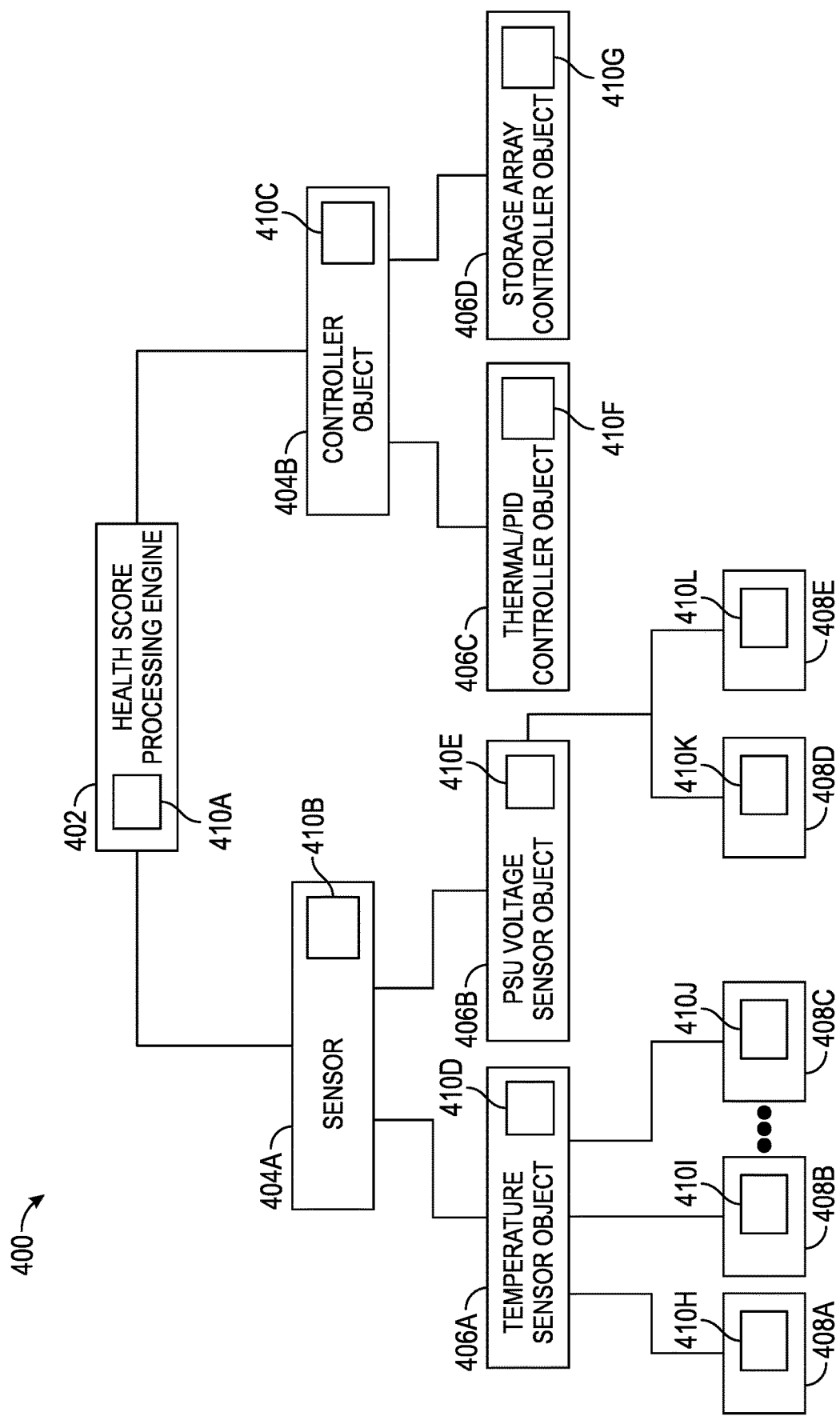
FIG. 4 illustrates an example D-Bus-based health status data model that may be implemented in the BMC to generate health status scores for the IHS according to one embodiment of the present disclosure.

FIG. 4 illustrates an example D-Bus-based health status data model 400 that may be implemented in the BMC 230 to generate health status scores for the IHS 200 according to one embodiment of the present disclosure. The D-Bus health status data model 400 includes a hierarchy of objects 402, 404, 406, 408 that are each arranged according to a parent-child relationship. For example, a health status root object 402 may be the parent of a sensor object 404*a* and a controller object 404*b*, the sensor object 404*a* may be the parent of a temperature sensor object 406*a* and a PSU voltage sensor object 406*b*, while the temperature sensor object 406*a* may be the parent of multiple temperature sensor objects 408*a-e* (collectively 408). Additionally, the health status root object 402 may be a parent of a controller object 404*b*, which in turn is the parent of a thermal/PID controller object 406*c* and a storage array controller object 406*d*. It should be appreciated that the D-Bus-based health status data model 400 is not an exhaustive representation of all the objects instantiated for use in the BMC 230 as many other objects have been omitted from the D-Bus-based health status data model 400 as shown for purposes of brevity and clarity of disclosure.

Certain objects 402, 404, 406, 408 may represent services 306 configured on the D-Bus 304. For example, the health status root object 402 may represent the health status service 306*u*, while the temperature sensor object 406*a* may represent the temperature sensor daemon 306*m* as described herein above with reference to FIG. 3. Each of the temperature sensor objects 408 may interact with a particular temperature sensor configured in the IHS 200. For example, the temperature sensor object 408*a* may be associated with a CPU temperature sensor 312 that monitors the temperature of the CPU of the IHS 200, while the temperature sensor object 408*b* may be associated with a storage array temperature sensor 312 that monitors the temperature of a storage array configured in the IHS 200.

Each of the objects 402, 404, 406, and 408 is configured with a health status calculating engine 410*a-l* (collectively 410) that calculates a local health status score for itself and its child objects. The health status calculating engine 410*h* in temperature sensor object 408*a*, which is a leaf node, may calculate a health score based on telemetry data by its associated temperature sensor 312. If the temperature sensor 312 associated with the temperature sensor object 408*a* is a CPU temperature sensor, for example, its health status calculating engine 410*h* may apply certain criteria, such as if the measured temperature is less than 90 degrees, assign the CPU temperature sensor with a health score of 100%, if the measured temperature is greater than 90 degrees but less than 120 degrees, assign the CPU temperature sensor with a health score of 90%, and if the measured temperature is greater than 140 degrees, assign the CPU temperature sensor with a health score of 70%.

Objects other than leaf node objects may calculate a health score based on each of its child objects. For example, the temperature sensor object 406*a* may derive a health score based on each of its constituent child objects 408*a-c* according to any suitable criteria. Furthering this example, the temperature sensor object 406*a* may generate a health score based on an average of the health scores reported from each of its child temperature sensor objects 408*a-c*. In one embodiment, the temperature sensor object 406*a* may generate a health score based on a weighted average of the health scores reported from each of its child temperature sensor objects 408a-c in which a certain measured temperature (e.g., CPU temp) may be relatively more important than another measured temperature (e.g., ambient chassis temp). A similar process may be performed for the health status calculating engine engines 410 configured in the other objects 402, 404, 406 in the D-Bus-based health status data model 400. For example, the health status root object 402 may calculate an overall health score based upon the health scores reported from its child objects, namely the sensor object 404a and controller object 404b.

Because each child object is inherited from its parent, it has information about its parent object, such as addressing information used to access it. The parent may also have information about each of its child objects. A chain of parent-child information from a particular object to the health status root object 402 may be referred to as a health path. For example, a health path may be formed from temperature sensor object 408a to temperature sensor object 406a to sensor object 404a and ending at the health status root object 402. Thus, the health status calculating engine engines 410a executed in the root object 402 may possess means to coherently relate measurements from disparate objects 404, 406, 408 with one another. For example, to accurately determine the health of a storage array may require, among other things, relating a temperature measurement of the storage array along with a rate of read/write cycles to a swap storage region of the storage array. Thus, knowing the health path of one of the temperature sensor objects 408a-c and the storage array controller object 406d enables the D-Bus-based health status generation system 300 to relate at least the two measurements for accurately estimating the health status of the storage array.

Figure 5:
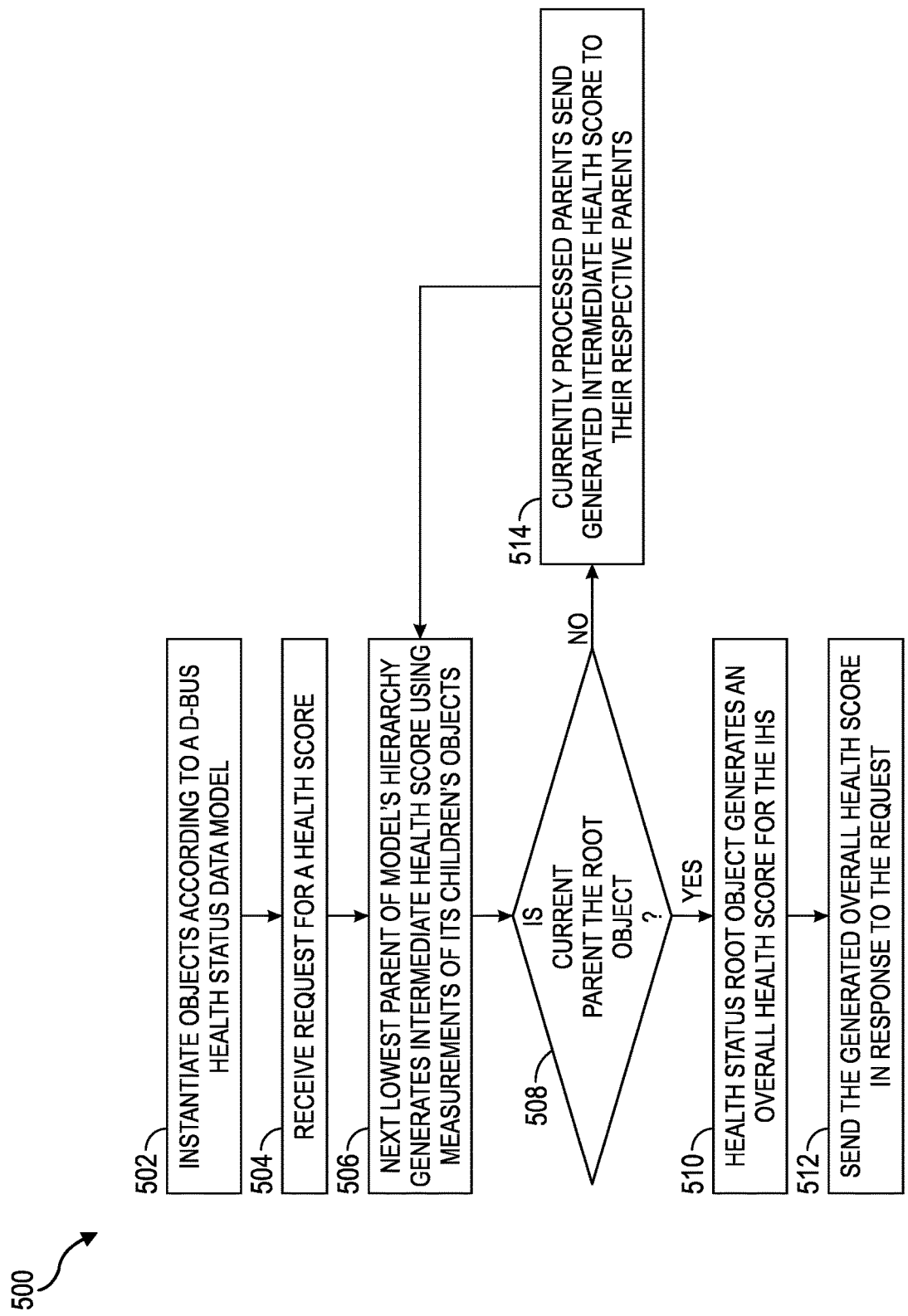
FIG. 5 illustrates an example D-Bus-based health status generation method showing how disparate services may be correlated with one another to generate a health score for an IHS according to one embodiment of the present disclosure.

FIG. 5 illustrates an example D-Bus-based health status generation method 500 showing how disparate services 306 may be correlated with one another to generate a health score for an IHS 200 according to one embodiment of the present disclosure. Additionally or alternatively, the D-Bus-based health status generation method 500 may be performed in whole or in part, by the D-Bus-based health status generation system 300 as shown and described above with reference to FIG. 3.

The D-Bus-based health status generation method 500 described herein as being implemented on a BMC 230. Nevertheless, it is contemplated that the D-Bus-based health status generation method 500 may be implemented on any computing device (e.g., IHS 200) that is configured with D-Bus. The D-Bus-based health status generation method 500 may be particularly beneficial when used with BMCs 230 because, among other things, D-Bus is supported with numerous D-Bus interfaces often provided by third party developers. That is, developers would like to have the ability to re-use established open source code rather than develop the code from the ground up. The D-Bus-based health status generation method 500, when implemented on a BMC 230, provides a D-Bus simulation system and method that generates a D-Bus simulation service to simulate one or more properties in a D-Bus-based BMC so that the level of platform testing may be enhanced, particularly when certain services are not yet available for testing.

Initially at step 502, the method 500 instantiates objects 402, 404, 406, 408 according to D-Bus health status data model 400. The objects 402, 404, 406, 408 may be instantiated, for example, whenever the BMC 230 is started for the first time or re-booted. When each object 402, 404, 406, 408 is instantiated, its parent-child relationship is recorded so that a health path may be created for accessing that object from other disparate objects 402, 404, 406, 408 configured on the D-Bus. Additionally, some, most, or all objects 402, 404, 406, 408 may be configured with a health score determining logic for generating a local health score associated with itself and its child objects.

For example, the health status root object 402 may be included with logic for generating an overall health score for the HIS 200, while the intermediate objects 404, 406 may be included with logic for generated an intermediate health score using values obtained from its child objects, the child objects of their child objects (e.g., their children's children), and so on. The values, for example, may be intermediate health scores generated by an object's child or a raw measurement obtained from one of its children's leaf object. Furthering this example, if the type of object 402, 404, 406, 408 is a temperature sensor object, logic may be included in the object for deriving an intermediate health score based only on temperature objects in the IHS 200, or reporting certain temperature measurements to the root object 402 for generating an overall health score using other objects in the D-Bus-based health status data model 400.

Any time after the objects 402, 404, 406, 408 in the D-Bus-based health status data model 400 have been created (e.g., instantiated), the D-Bus-based health status generation method 500 may receive a request for a health score at step 504. For example, the request could be a manual request that is a result of user input, or the request could be triggered automatically, such as at ongoing intervals (e.g., periodically), or whenever an event occurs (e.g., failure of certain hardware devices 310 configured in the IHS 200). In response to the request, the next lowest parent of model's hierarchy generates an intermediate health score using measurements of its children's objects at step 506. Given the D-Bus-based health status data model 400 of FIG. 4 for example, generating an overall health score may commence with the temperature sensor object 406a generating a local health score using measurements from its child objects 408a-c, the voltage sensor object 406b generating a local health score using measurements from its child objects 408d-e, and the controller object 404b generating a local health score using measurements from its child objects 406c-d.

Thereafter at step 508, the D-Bus-based health status generation method 500 determines whether the currently processed object is the health status root object 402. If not, processing continues at step 514 in which the currently processed objects 402, 404, 406, 408 sends locally generated health scores to their parent objects, and those parent objects begin generating their local health scores at step 506. If, however, the current object is the health status root object 402, The health status calculating engine 410a configured in the root object 402 generates an overall health score for the IHS 200 at step 510, and sends the generated overall health score to the requester in response to the request at step 512.

Steps 504-514 may be performed each time an overall health score for the IHS 200 is requested. Nevertheless, when use of the D-Bus-based health status generation method 500 is no longer needed or desired, the method 500 ends.

Although FIG. 5 describes an example method 500 that may be performed to simulate data generated by a D-Bus service 306, the features of the disclosed processes may be embodied in other specific forms without deviating from the spirit and scope of the present disclosure. For example, certain steps of the disclosed method 500 may be performed sequentially, or alternatively, they may be performed concurrently. As another example, the method 500 may perform additional, fewer, or different operations than those operations as described in the present example. As yet another example, the steps of the processes described herein may be performed by an executable process other than the D-Bus-based health status generation system 300 as described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
 a plurality of hardware devices that are managed by a plurality of Desktop Bus (D-Bus) objects that communicate among one another using a D-Bus, the D-Bus objects arranged in a hierarchy of parent-child relationships; and
 at least one processor; and
 at least one memory coupled to the at least one processor, the at least one memory having program instructions stored thereon that, upon execution by the at least one processor, cause each of the D-Bus objects to:
  receive a request for a health score of one of the hardware devices that it manages using one or more child objects that interact with the one hardware device; and
  generate an intermediate health score using measurements obtained by its child objects; and
  send the intermediate health score to its parent object.

2. The IHS of claim 1, wherein the instructions, upon execution, cause a root D-Bus object of the plurality of D-Bus objects to:
 receive one or more intermediate health scores from its child objects;
 generate an overall health score using the intermediate health scores; and
 send the overall health score in response to the request.

3. The IHS of claim 1, wherein the instructions, upon execution, cause each of the D-Bus objects to:
 using the parent-child relationships of the D-Bus objects, identify a path from an attribute of a leaf D-Bus object to a root object;
 using the path, obtain the attribute from the hardware-based D-Bus service; and
 generate, by the root object, the health status score according to the obtained attribute; and
 send the health status score in response to the request.

4. The IHS of claim 1, wherein at least one of the D-Bus objects comprises a hardware-based D-Bus service.

5. The IHS of claim 1, wherein the instructions, upon execution, cause each of the D-Bus objects to receive the request manually according to user input.

6. The IHS of claim 1, wherein the instructions, upon execution, cause each of the D-Bus objects to receive the request automatically according to at least one of at ongoing intervals or in response to a failure event of one of the hardware devices.

7. The IHS of claim 1, wherein each of the D-Bus objects are executed on a Baseboard Management Controller (BMC).

8. A Desktop Bus (D-Bus)-based health status generation method comprising:
 providing a plurality of hardware devices that are managed by a plurality of D-Bus objects that communicate among one another using a D-Bus, the D-Bus objects arranged in a hierarchy of parent-child relationships;
 receiving a request for a health score of one of one of a plurality of hardware devices that it manages using one or more child objects that interact with the one hardware device;
 generating an intermediate health score using measurements obtained by its child objects; and
 sending the intermediate health score to its parent object.

9. The D-Bus-based health status generation method of claim 8, further comprising:
 receiving one or more intermediate health scores from its child objects;
 generating an overall health score using the intermediate health scores; and
 sending the overall health score in response to the request.

10. The D-Bus-based health status generation method of claim 8, further comprising:
 using the parent-child relationships of the D-Bus objects, identifying a path from an attribute of a leaf D-Bus object to a root object;
 using the path, obtaining the attribute from the hardware-based D-Bus service; and
 generating, by the root object, the health status score according to the obtained attribute; and
 sending the health status score in response to the request.

11. The D-Bus-based health status generation method of claim 8, further comprising receiving the request manually according to user input.

12. The D-Bus-based health status generation method of claim 8, further comprising receiving the request automatically according to at least one of at ongoing intervals or in response to a failure event of one of the hardware devices.

13. The D-Bus-based health status generation method of claim 8, wherein each of the D-Bus objects are executed on a Baseboard Management Controller (BMC).

14. A memory storage device having program instructions stored thereon that, upon execution by one or more processors of a client Information Handling System (IHS), cause the client IHS to:
- receive a request for a health score of one of one of a plurality of hardware devices that it manages using one or more child objects that interact with the one hardware device, the hardware devices being managed by a plurality of Desktop Bus (D-Bus) objects that communicate among one another using a D-Bus, the D-Bus objects arranged in a hierarchy of parent-child relationships; and
- generate an intermediate health score using measurements obtained by its child objects; and
- send the intermediate health score to its parent object.

15. The memory storage device of claim 14, wherein the instructions, upon execution, cause a root D-Bus object of the plurality of D-Bus objects to:
- receive one or more intermediate health scores from its child objects;
- generate an overall health score using the intermediate health scores; and
- send the overall health score in response to the request.

16. The memory storage device of claim 14, wherein at least one of the D-Bus objects comprises a hardware-based D-Bus service.

17. The memory storage device of claim 14, wherein the instructions, upon execution, cause each of the D-Bus objects to:
- using the parent-child relationships of the D-Bus objects, identify a path from an attribute of a leaf D-Bus object to a root object;
- using the path, obtain the attribute from the hardware-based D-Bus service; and
- generate, by the root object, the health status score according to the obtained attribute; and
- send the health status score in response to the request.

18. The memory storage device of claim 14, wherein the instructions, upon execution, cause each of the D-Bus objects to receive the request manually according to user input.

19. The memory storage device of claim 14, wherein the instructions, upon execution, cause each of the D-Bus objects to receive the request automatically according to at least one of at ongoing intervals or in response to a failure event of one of the hardware devices.

20. The memory storage device of claim 14, wherein each of the D-Bus objects are executed on a Baseboard Management Controller (BMC).

* * * * *